United States Patent
Ta et al.

(10) Patent No.: US 8,103,221 B2
(45) Date of Patent: Jan. 24, 2012

(54) HIGH-ISOLATION TRANSMIT/RECEIVE SWITCH ON CMOS FOR MILLIMETER-WAVE APPLICATIONS

(75) Inventors: Chien M. Ta, Carnegie (AU); Stan Skafidas, Thornbury (AU); Rob Evans, Aspendale (AU)

(73) Assignee: National ICT Australia Limited, Eveleigh (AU)

( * ) Notice: Subject to any disclaimer, the term of this patent is extended or adjusted under 35 U.S.C. 154(b) by 908 days.

(21) Appl. No.: 12/130,869

(22) Filed: May 30, 2008

(65) Prior Publication Data

US 2009/0298443 A1 Dec. 3, 2009

(51) Int. Cl.
*H04B 1/46* (2006.01)

(52) U.S. Cl. .......... 455/81; 455/78; 455/80; 455/82; 455/83; 333/101; 333/103; 333/104; 333/124

(58) Field of Classification Search .......... 455/73–84; 333/101, 103–104, 110, 115–117, 124, 126–127, 333/132, 135; 327/308, 365
See application file for complete search history.

(56) References Cited

U.S. PATENT DOCUMENTS

| 4,978,932 A * | 12/1990 | Gupta et al. | 333/81 R |
| 6,882,836 B2 * | 4/2005 | Wilcox | 455/271 |
| 7,411,471 B2 * | 8/2008 | Tsukahara | 333/104 |
| 7,848,712 B2 * | 12/2010 | Fu et al. | 455/80 |

* cited by examiner

*Primary Examiner* — Tuan A Tran (57) ABSTRACT

A CMOS monolithic transmit/receive switch comprises a single pole double throw switch (SPDT) module operable to selectively connect an antenna port to either a transmit port or to a receive port. A transmit matching network comprising a first transmission line matches the impedance of the transmit port of the SPDT module to a transmit impedance, and a first shunt transistor is operable to selectively ground a transmitter end of the first transmission line. A receive matching network comprising a second transmission line matches the impedance of the receive port of the SPDT module to a receive impedance, and a second shunt transistor is operable to selectively ground a receiver end of the second transmission line.

11 Claims, 6 Drawing Sheets

HIGH-ISOLATION TRANSMIT/RECEIVE SWITCH ON CMOS FOR MILLIMETER-WAVE APPLICATIONS

BACKGROUND OF THE INVENTION

1. Field of the Invention

The present invention relates to a transmit/receive switch which allows a millimeter wave antenna or antenna system to be shared for use by both a transmitter and by a receiver.

2. Description of Related Art

Modern wireless communications systems require transceivers that deliver gigabit speeds, are smaller in size, and have lower power consumption and cost. This motivates research to develop transceiver-on-chip and transceiver-in-a-package technologies. Recent advances in millimeter wave electronics have meant that significant portions of the system can now be integrated onto a single substrate or package. In order to achieve low costs and high digital integration, the complementary metal-oxide-semiconductor (CMOS) fabrication process is the process of choice as CMOS is the standard and a cost effective process for building digital circuits. Unfortunately, compared to other much more expensive processes such as SiGe and GaAs, CMOS has greater process variability, lower carrier mobility constants, and smaller device breakdown voltages. This makes the design of millimeter wave wireless transceivers on a CMOS chip particularly challenging.

Rather than having two separate antennas with one antenna used exclusively for transmitting and the other antenna used exclusively for receiving, one way to reduce the size of a transceiver is to use a transmit/receive (T/R) switch to selectively connect both a transmitter and a receiver to a single antenna. Eliminating one antenna saves substantial space. However, T/R switches must be a high performance component as transmitted signals are often magnitudes of order more powerful than received signals, meaning that even slight leakage of transmit signals to the receiver circuitry could saturate the receiver circuitry. Consequently, high isolation must be provided by the T/R switch.

The lossy and relatively poor performance of CMOS makes T/R switch isolation very difficult to achieve, particularly at millimeter-wave frequencies. Consequently T/R switches at RF or millimeter wave frequencies are usually built as a discrete component on gallium-arsenide and P-I-N diode technologies. However these technologies make costs much higher, make integration with other CMOS circuitry difficult, and do not permit system-on-a-chip in CMOS. T/R switches might also be made using integrated bipolar junction transistor and CMOS (BiCMOS) technologies, or silicon on insulator (SOI) technology, however these also raise costs relative to CMOS processes.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise," or variations such as "comprises" or "comprising," will be understood to imply the inclusion of a stated element, integer or step, or group of elements, integers or steps, but not the exclusion of any other element, integer or step, or group of elements, integers or steps.

SUMMARY OF THE INVENTION

According to a first aspect the present invention provides a CMOS monolithic transmit/receive switch comprising:

a single pole double throw switch (SPDT) module operable to selectively connect an antenna port to either a transmit port or to a receive port;

a transmit matching network comprising a first transmission line matching the impedance of the transmit port of the SPDT module to a transmit impedance, and a first shunt transistor operable to selectively ground a transmitter end of the first transmission line; and a receive matching network comprising a second transmission line matching the impedance of the receive port of the SPDT module to a receive impedance, and a second shunt transistor operable to selectively ground a receiver end of the second transmission line.

According to a second aspect the present invention provides a method of transmit/receive switching, the method comprising:

using a single pole double throw switch (SPDT) module to selectively connect an antenna port to either a transmit port or to a receive port;

impedance matching a transmitter to the transmit port by connecting a first transmission line between the transmitter and the transmit port;

selectively grounding a transmitter end of the first transmission line, to isolate the transmitter during receive periods;

impedance matching a receiver to the receive port by connecting a second transmission line between the receiver and the receive port; and selectively grounding a receiver end of the second transmission line, to isolate the receiver during transmit periods.

According to a third aspect the present invention provides a fully integrated CMOS millimeter wave transceiver comprising a transmit/receive switch in accordance with the first aspect.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

The 60-GHz band has been released for unlicensed use as a response to the demand of broadband wireless communications. The short wavelength at 60 GHz makes it possible to integrate the antennas and the RF transceiver on a single die. The present invention provides for a T/R switch to be employed so that a single antenna can be shared between the transmitter and the receiver to save area and cost of the chip. Even if an off-chip antenna is desired, an integrated T/R switch can still be used to reduce cost.

At millimeter-wave frequencies, the design of silicon-based T/R switches becomes much more challenging due to the coupling of the RF signals to the semiconductive silicon substrate. First, insertion loss is increased because of signal loss in the substrate. Second, isolation is decreased as a result of resistive coupling through the substrate. Apart from the detrimental effects of the silicon substrate, the low control voltage that accompanies deep submicron CMOS technology limits the power handling capability of the switch.

Figure 1:
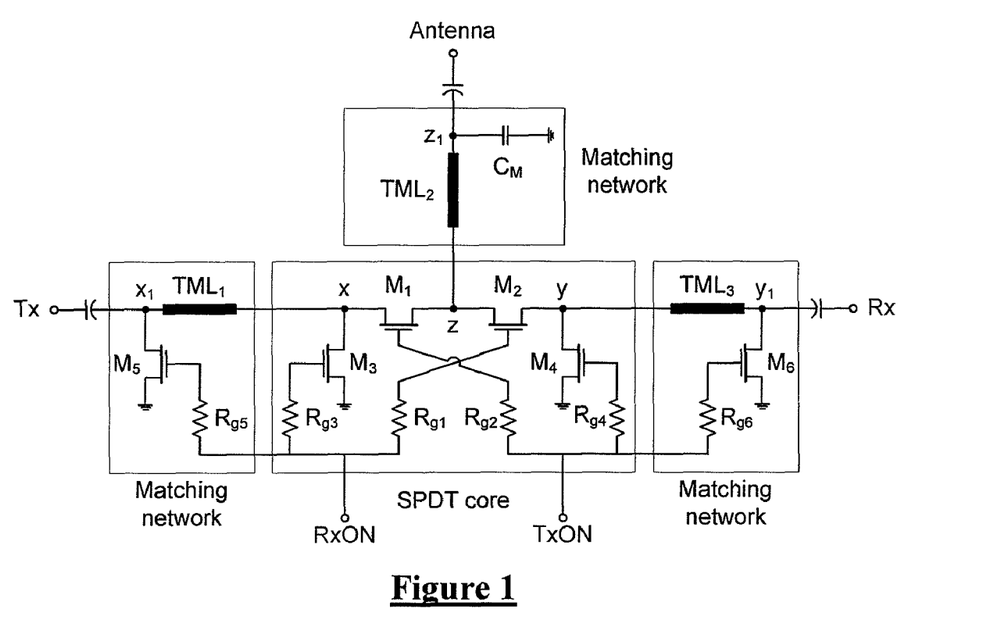
FIG. 1 is a circuit schematic illustrating a T/R switch in accordance with one embodiment of this invention.

Key design specifications for a T/R switch are insertion loss, isolation, and power handling capability (IP1 dB). Recognizing that high isolation is difficult to achieve at 60 GHz, the present invention provides for a shunt-series single pole double throw (SPDT) architecture for the switch. The topology of the T/R switch, as shown in FIG. 1, includes a SPDT switching core 110 and three impedance matching networks 120, 122, 124 corresponding to three RF ports of the transmitter, antenna and receiver, respectively.

The SPDT core 110 is built upon several MOS transistor switches. The SPDT core 110 includes four switching NFETs ($M_1$-$M_4$) whose ON/OFF states are controlled by the voltages applied to the RxON and TxON pins through four biasing resistors ($R_{g1}$-$R_{g4}$). When RxON is at high level and TxON is at low level, $M_2$ and $M_3$ are in ON state (short circuit) and $M_1$ and $M_4$ are in OFF state (open circuit), allowing signals to pass from the antenna (node z) to the receive size (node y). In other words, the switch is in receiving mode in this state. When TxON is at high level and RxON is at low level, $M_1$ and $M_4$ are in ON state (short circuit) and $M_2$ and $M_3$ are in OFF state (open circuit) thus the signal can go from transmit side (node x) to antenna size (node z). In other words, the switch is in transmit mode in this state. By controlling the voltages at RxON and TxON in a complementary manner, the T/R switch can be changed between transmit and receive mode electrically.

Figure 2A:
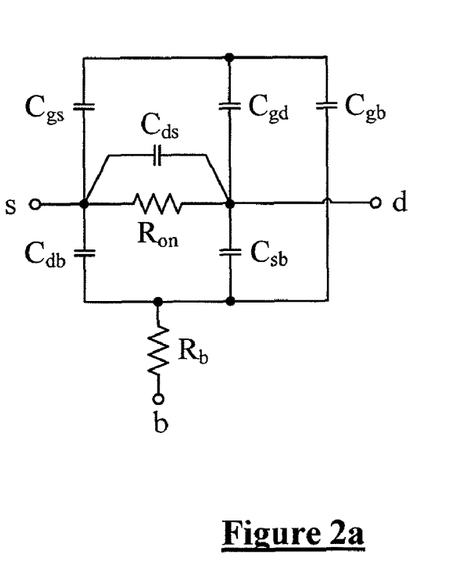
FIGS. 2a and 2b illustrate models of a MOS transistor when biased ON, and when biased OFF, respectively.
Figure 2B:
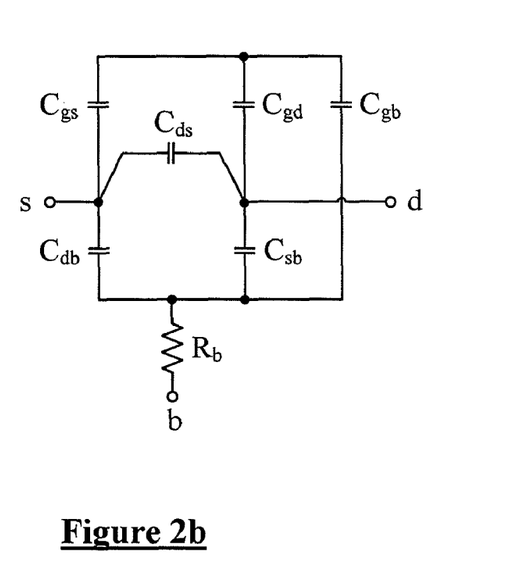

The present embodiment of the invention further addresses trade-offs applicable in the design of a MOS transistor switch at millimeter wave frequencies. Models of a MOS transistor biased in the deep triode region, corresponding to the ON state of the switch, and in the cut-off region, corresponding to the OFF state of the switch, are shown in FIGS. 2(a) and (b), respectively. The insertion loss of a MOS transistor switch under the ON state is dominated by its on-resistance, $R_{on}$, and substrate resistance, $R_b$. Isolation of the switch under the OFF state is finite due to signal coupling through the parasitic capacitances, $C_{ds}$, $C_{gs}$, and $C_{gd}$, and through the junction capacitances, $C_{sb}$ and $C_{db}$. The power handling capability of the switch is limited due to the unintentional turning on of the source/drain-to-substrate junction diodes. In FIG. 2 these diodes are represented by their junction capacitances, $C_{sb}$ and $C_{db}$.

The on-resistance is given by:

$$R_{on} = \frac{1}{\mu C_{ox} \frac{W}{L}(V_{gs} - V_{TH})}. \qquad (1)$$

The present embodiment is based in part on the recognition that to reduce the insertion loss it is desired to keep $R_{on}$ small, and that this can be achieved by: choosing a transistor with large μ; increasing W/L; and keeping $V_{gs}$-$V_{TH}$ large. The first criterion can be addressed by using NMOS transistors rather than PMOS transistors in the design. The second criterion suggests the use of transistors with minimum allowable channel length. Because the minimum value of L is limited by the CMOS fabrication technology, being 130 nm minimum line width in this embodiment, low $R_{on}$ eventually requires large W. However, widening a transistor will increase its junction and parasitic capacitances proportionally. There are several consequences of this effect. When the transistor is ON, increasing $C_{sb}$ and $C_{db}$ leads to more signal being coupled to the substrate and dissipated in the substrate resistance $R_b$. When the transistor is OFF, increased $C_{ds}$, $C_{gd}$, and $C_{gs}$ lead to lower isolation between the source and drain due to capacitive coupling between these terminals.

There exist differences between the design of MOS transistor switches at 60-GHz band as compared to frequencies of 15 GHz and below. For low frequency designs, isolation is not a parameter that is optimized during the design process because adequate isolation can be obtained at low frequencies. Thus, in these designs, only insertion loss needs to be minimized. No tradeoff between insertion loss and isolation is required. On the other hand, the present embodiment is based in part on the recognition that at 60 GHz, isolation is smaller due to several low impedance paths caused by parasitic capacitances. This necessitates a trade-off between insertion loss and isolation when sizing the transistors.

Apart from reducing the transistor size, another measure to reduce the junction capacitances is to exploit their bias dependent nature, which is formulated as:

$$C_{sb/db} = \frac{\text{Area} \times C_{j0}}{(1 + V_R/\Phi_B)^{m_j}} + \frac{\text{Perimeter} \times C_{jsw0}}{(1 + V_R/\Phi_{Bsw})^{m_{jsw}}} \qquad (2)$$

where $V_R$ is $V_{sb}$ or $V_{db}$, $>_B$ and $>_{Bsw}$ are the junction and sidewall built-in potentials, $C_{j0}$ and $C_{jsw0}$ are the capacitance per unit area and unit length of the junction and the sidewall when $V_R$=0. The present embodiment recognizes that this expression signifies that by biasing the source/drain to a higher voltage, smaller junction capacitances can be obtained. In addition, positively biasing the source/drain also increases the power handling capability of the switch. However, when $V_d$ and $V_s$ increase, two more effects take place concurrently: (a) $V_{gs}$ decreases, and (b) $V_{TH}$ increases because:

$$V_{TH} = V_{TH0} + \gamma\left(\sqrt{|2\Phi_F + V_{sb}|} - \sqrt{|2\Phi_F|}\right) \qquad (3)$$

where K is the body effect coefficient and $>_F$ is the Fermi level in the substrate. The simultaneous reduction in $V_{gs}$ and increase in $V_{TH}$ result in smaller $V_{gs}$-$V_{TH}$. This leads to higher $R_{on}$ in accordance with equation (1) set out in the preceding. Thus, the present embodiment recognizes that by increasing the source/drain voltage we sacrifice insertion loss for power handling capability.

Taking into account the effects of sizing and biasing on insertion loss, isolation, and power handling capability, the SPDT core of this embodiment was designed as follows. The source/drain of all transistors were biased to 0 V to keep $R_{on}$ low, acknowledging that this was at the expense of reduced power handling capability. This trade-off is required here because the control voltage ($V_g$) is limited to 1.2 V and power requirements are low for short range communications, being the intended field of application for this embodiment. Alternative embodiments of the invention may select a different bias voltage, for example where the field of application leads to a different trade off between insertion loss and power handling capability.

The main switching transistors, $M_1$ and $M_2$ shown in FIG. 1, are sized with a finger width and length to provide low on-resistance whilst presenting moderate junction capacitances. Low capacitance is necessary to keep the Q factor of the circuit low which allows wideband matching to a 50 Α source/load. Low Q circuits are also less sensitive to parasitic capacitances and process variations. The transistors $M_3$ and $M_4$ of the SPDT core 110 are introduced to increase the isolation of the switch 110 even though they do introduce additional capacitances and losses at nodes x and y in FIG. 1. The sizes of the transistors of FIG. 1 are:

$M_1=M_2=27.0$ Tm width, 0.13 Tm length; and
$M_3=M_4=M_5=M_6=10.8$ Tm width, 0.13 Tm length.

The gates of all transistors are biased through large resistors (10 kA) which make the gate terminals appear to be open to AC signals. Thus, substantially no power loss occurs at the gate terminals.

We now describe the design of the impedance matching networks. The low input impedance at nodes x, y, and z in FIG. 1 are transformed to 50 Α by LC impedance matching networks. In accordance with the present invention, the series inductors of these LC networks are realized by transmission lines ($TML_{1-3}$). The capacitors of these LC networks are implemented as a finger metal capacitor, $C_M$, at the antenna port and as junction capacitances (of $M_5$ and $M_6$) at $T_x$ and $R_x$ ports. The shunt transistors $M_5$ and $M_6$ are used because high isolation is desired in this design. Transistors $M_5$ and $M_6$ help improve both the impedance matching and the isolation of the T/R switch. These transistors are switched by applying control voltage to RxON and TxON, so that $M_5$ and $M_6$ change states at the same time as $M_1$-$M_4$. The impedance matching networks allows the T/R switch to be coupled efficiently with other components.

Finally, metal-insulator-metal (MIM) capacitors are used for AC coupling at all three RF ports. The bottom-plate parasitic capacitance of these capacitors are absorbed into the matching networks to mitigate the non-linearity of the junction capacitances at nodes $x_1$ and $y_1$. By using on-chip DC blocking capacitors, the present embodiment provides for the T/R switch to be completely integrated so that it can operate without any off-chip components.

The present embodiment further addresses layout considerations. In the small-signal models in FIG. 2 it is assumed that the gate of the MOS transistor is biased through a very large resistor which effectively makes the gate terminal open to AC signals. To preserve the effectiveness of $R_g$, special attention has been paid in this embodiment to keeping $C_{gb}$ small as this parasitic capacitance is in parallel with $R_g$.

Transmission lines are implemented in microstrip form with the signal line on the top metal layer and ground on the lowest metal layer (M1) of the CMOS process. The ground plane of the microstrip helps minimize electric field from penetrating into the substrate and introducing losses. Other signal-bearing metal such as connections and RF pads are also shielded from the lossy substrate by the M1 ground-plane. Substrate shield techniques are employed throughout the design to reduce substrate coupling and create well-defined parasitic capacitances that can be predicted by extraction tools.

Figure 3:
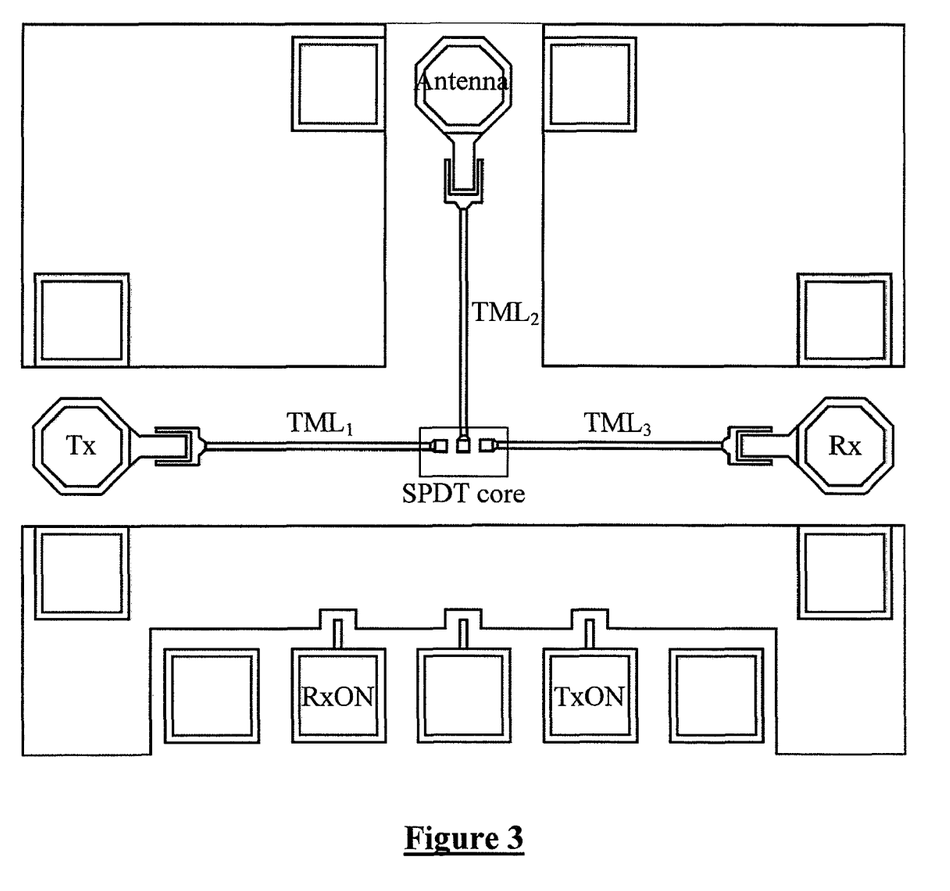
FIG. 3 is a microphotograph of a CMOS T/R switch in accordance with one embodiment of the invention.

The design of this embodiment is realized in a commercially available RF CMOS technology which features thick metal layers that can be used to implement high-Q inductors, capacitors, and transmission lines. FIG. 3 is a microphotograph of the T/R switch of this embodiment. The layout (without test pads) occupies an area of 680 μm×325 μm. A summary of the performance of the T/R switch is given in Table I.

TABLE I

| Frequency band | 57 GHz to 66 GHz |
| --- | --- |
| Control voltage | 1.2 V/0 V |
| Insertion loss | 4.5 dB to 5.8 dB |
| Isolation | 24.1 dB to 26 dB |
| Return loss at Tx/Rx port | −15 dB to −27 dB |
| Return loss at antenna port | −9.2 dB to −10.5 dB |
| $IP_{1\,dB}$ | 4.1 dBm |
| $t_{rise}$ | 400 ps |
| $t_{fall}$ | 360 ps |

Figure 4:
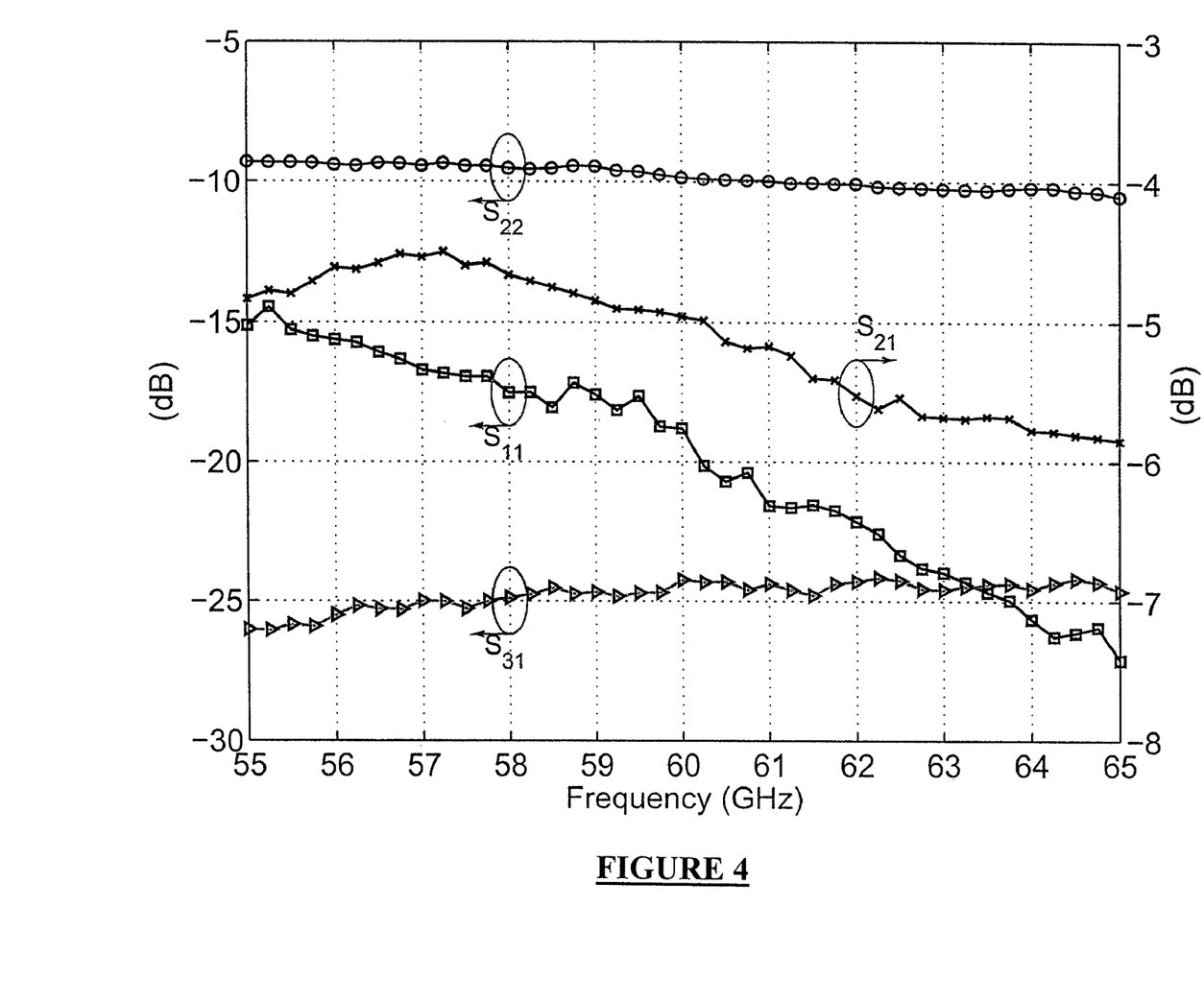
FIG. 4 is a plot of the s-parameters of the T/R switch of FIG. 3.

To determine small-signal performance, S-parameters up to 65 GHz were measured on-wafer and de-embedded. The results are shown in FIG. 4. Return loss at Tx port, $S_{11}$, is from −15 dB to −26 dB. Return loss at antenna port, $S_{22}$, is from −9.2 dB to −10.5 dB. Insertion loss measured between Tx port and antenna port varies between 4.5 dB and 5.8 dB. This high insertion loss is due to loss in the silicon substrate as mentioned previously. Although this insertion loss is higher than that of discrete T/R switches in GaAs, for discrete components, additional losses associated with cables and connectors, which are quite high at 60 GHz, must be taken into account in the system implementation. Isolation measured between the Tx port and the Rx port is from 24.1 dB to 26 dB which is comparable to the level of isolation offered by discrete switches.

Figure 5:
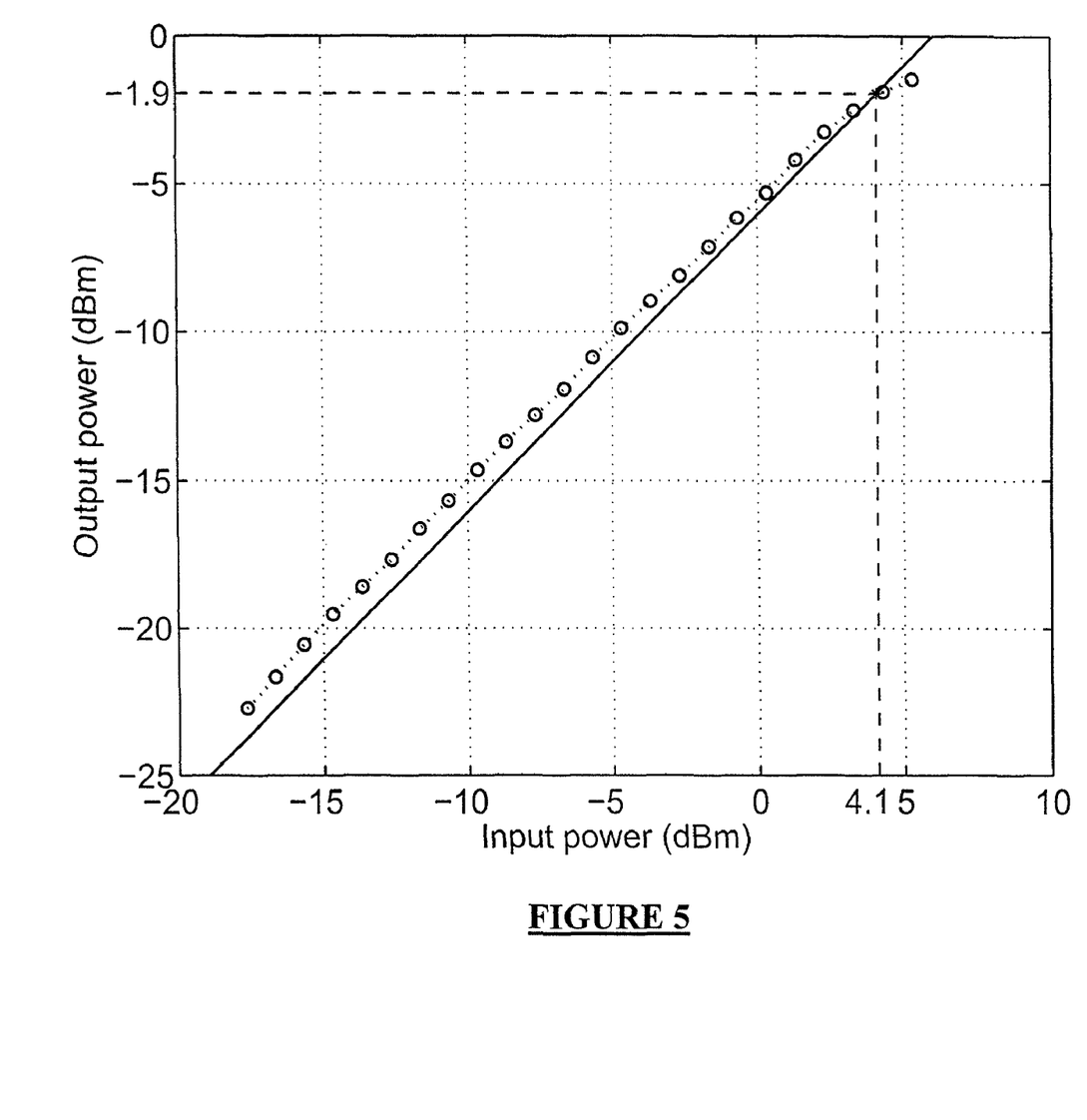
FIG. 5 is a plot of output power vs. input power, illustrating the power handling capability of the T/R switch of FIG. 3.

In considering power handling capability of this embodiment, it is seen that at 60 GHz, the T/R switch starts to compress at 4.1 dBm input power as shown in FIG. 5. This low $IP_{1\,dB}$ is due to the fact that the control voltage is low (only 1.2 V) and the sources/drains of the transistors are biased to ground. Higher power handling capability can be achieved in alternative embodiments by using a higher control voltage and biasing the sources/drains of the transistors to higher potential.

Figure 6:
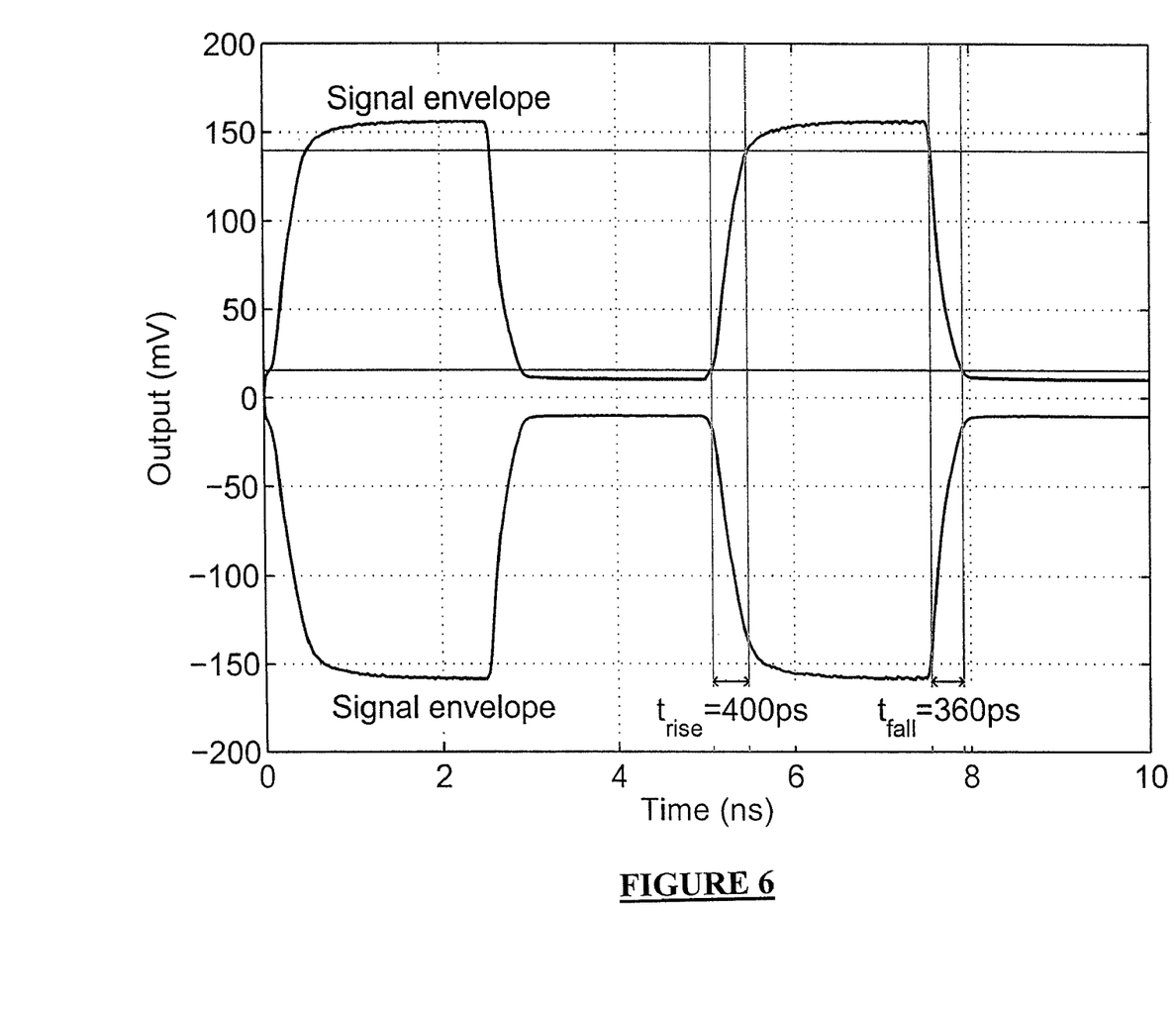
FIG. 6 is a trace showing switching times of a simulation of the switch of FIG. 3.

The switching speed of the T/R switch is characterized by the rise time, $t_{rise}$, and fall time, $t_{fall}$. A simulation result to decide the switching speed is shown in FIG. 6. In this simulation, the control voltages are 50% duty pulses with a high level of 1.2 V and a low level of 0 V, the input signal is a sinusoid waveform at 60 GHz at −3 dBm. The rise time (from 10% to 90% of maximum output swing) and fall time (90% down-to 10% of maximum output swing) are 400 ps and 360 ps, respectively. This fast switching speed is possible owing to the small switching transistors. This sub-nanosecond switching speed is much faster than the speed of GaAs switches operating at GHz frequencies which is usually on the order of tens of nanoseconds. The switching speed can be improved further by decreasing the values of the gate resistors as long as the resistors are still large enough to make the gates open to AC signals.

The following figure of merit (FOM) was used for comparing this embodiment to other works.

$$FOM = \frac{\left(\frac{\text{Feature size} \times \text{Frequency} \times \frac{Vdd}{Vc}}{R_g}\right)^2 \times \text{Isolation} \times P_{1\text{ dB}}}{\text{Loss}}. \quad (4)$$

The T/R switch in this work has a FOM of 22.66 dB for both Tx and Rx, which is the best FOM among compared T/R switches of symmetrical types which do not optimize transmitting path and receiving path separately.

This embodiment thus provides a T/R switch in a low-cost CMOS technology for the 57-66 GHz band, which exhibits good matching and isolation. The control voltages of the switch are 0 V and 1.2 V so that the T/R switch can be driven directly by digital circuitry. This embodiment is suitable for short range wireless communications where power handling requirements are not very high.

Embodiments of the present invention thus recognize that a millimeter wave T/R switch may be fabricated on CMOS by providing matched transmission lines to compensate for lossy CMOS characteristics, and further by providing shunt transistors (e.g. see M5 and M6) which both effect the capacitance of the impedance matching network and also allow selective grounding of the transmitter and/or receiver as desired in order to improve isolation. The present invention recognizes that previous solutions have been limited to operate at low frequency where impedance matching and sufficient isolation is easier to achieve, and such solutions cannot operate at high frequency due to impedance mismatches and low isolation. This invention presents a method of modifying a single-pole double-throw switch by using impedance matching networks consisting of shunt transistor and series inductor to enable the operation of the switch at millimeter-wave frequencies with good impedance matching and high isolation.

By using CMOS technology, the T/R switch can be made cheaper than other solutions based on P-I-N diode or gallium-arsenide technologies. The T/R switch on CMOS also has the advantage of easy integration with other circuits that are built in CMOS.

Figure 7:
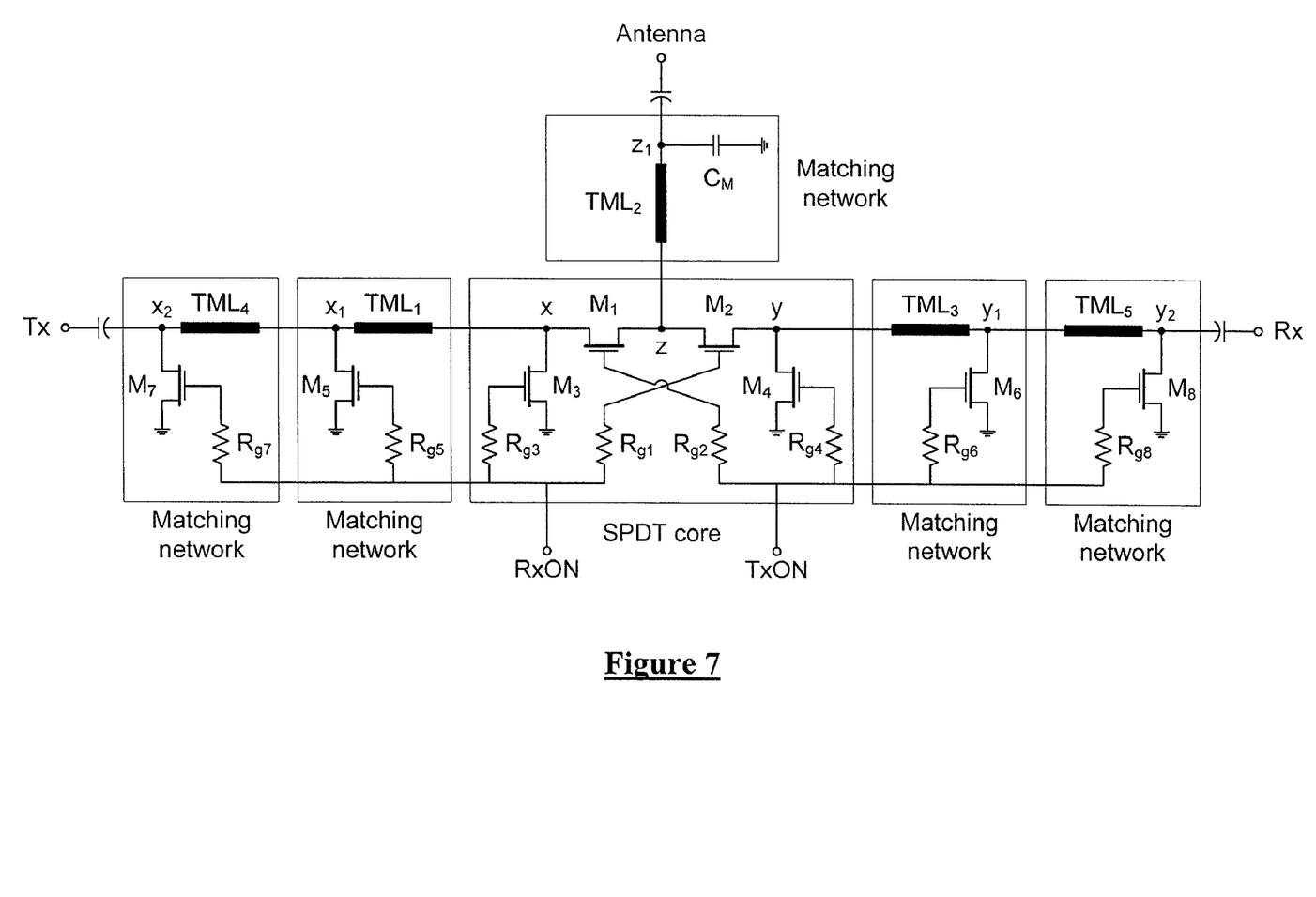
FIG. 7 is a circuit schematic illustrating a T/R switch in accordance with another embodiment of this invention.

FIG. 7 is a circuit schematic illustrating a T/R switch in accordance with another embodiment of this invention. This embodiment gives an example of how additional shunt transistors (or matching networks) can be added to improve transmitter and/or receiver isolation. The topology of the T/R switch shown in FIG. 7, includes a SPDT switching core 710 and three impedance matching networks 720, 722, 724 corresponding to three RF ports of the transmitter, antenna and receiver, respectively. The SPDT core 710 is built upon several MOS transistor switches, in the same manner described above in relation to FIG. 1 and therefore not described further.

The matching network 720 in this embodiment comprises a series of LC matching networks 720a and 720b. In network 720b, transmission line $TML_1$ inductively connects node x of the switching core 710 to node $x_1$, with $M_5$ providing the capacitive element and also providing for selective switching of node $x_1$ to ground during receive cycles. In network 720a, transmission line $TML_4$ inductively connects node $x_1$ to node $x_2$, with $M_7$ providing the capacitive element and also providing for selective switching of node $x_2$ to ground during receive cycles. The provision of two LC networks 720a and 720b each having a shunt transistor improves isolation of the transmitter during receive cycles.

Similarly, the matching network 724 in this embodiment comprises a series of LC matching networks 724a and 724b. In network 724a, transmission line $TML_3$ inductively connects node y of the switching core 710 to node $y_1$, with $M_6$ providing the capacitive element and also providing for selective switching of node $y_1$ to ground during transmit cycles. In network 724b, transmission line $TML_5$ inductively connects node $y_1$ to node $y_2$, with $M_8$ providing the capacitive element and also providing for selective switching of node $y_2$ to ground during transmit cycles. The provision of two LC networks 724a and 724b each having a shunt transistor improves isolation of the receiver during transmit cycles.

It will be appreciated by persons skilled in the art that numerous variations and/or modifications may be made to the invention as shown in the specific embodiments without departing from the scope of the invention as broadly described. For example, embodiments may optionally provide an antenna matching network comprising a third transmission line and a shunt capacitor, to match the impedance of the antenna port of the SPDT module to an antenna impedance.

The shunt transistors may be NFETs or other suitable transistor design. Control of the shunt transistors may be effected by independent switching control signals or advantageously by feeding the RxON signal of the SPDT core to the transmitter-side shunt transistor gate and similarly by feeding a TxON input of the SPDT core to the gate of the shunt transistor of the receive matching network.

Alternative embodiments might be applied in automobile radar applications, for example. The insertion loss and power handling capability of the switch may be improved in alternative embodiments by using a higher control voltage.

By implementing a T/R switch CMOS technology, the present invention allows integration of the T/R switch with other parts of the transceiver on the same silicon die to realize a small-size and low-cost transceiver.

The present embodiments are, therefore, to be considered in all respects as illustrative and not restrictive.

What is claimed is:

1. A CMOS monolithic transmit/receive (T/R) switch comprising:
    a single pole double throw switch (SPDT) module operable to selectively connect an antenna port to either a transmit port or to a receive port;
    a transmit matching network comprising a first transmission line matching the impedance of the transmit port of the SPDT module to a transmit impedance, and a first shunt transistor operable to selectively ground a transmitter end of the first transmission line; and
    a receive matching network comprising a second transmission line matching the impedance of the receive port of the SPDT module to a receive impedance, and a second shunt transistor operable to selectively ground a receiver end of the second transmission line.

2. The T/R switch of claim 1, further comprising an antenna matching network comprising a third transmission line and a shunt capacitor, to match the impedance of the antenna port of the SPDT module to an antenna impedance.

3. The T/R switch of claim 1, wherein the shunt transistor of the transmitter matching network is controlled by a RxON input of the SPDT core so as to ground the transmitter end of the first transmission line during a receive stage.

4. The T/R switch of claim 1, wherein the shunt transistor of the receiver matching network is controlled by a TxON input of the SPDT core so as to ground the receiver end of the second transmission line during a transmit stage.

5. The T/R switch of claim 1, wherein an operational frequency of the switch comprises 57-66 GHz.

6. The T/R switch of claim 1 wherein the switch is fabricated on a 130 nm process and wherein control voltages controlling the SPDT module and the first and second shunt transistors are 1.2 V and 0 V so as to provide for direct T/R switch control.

7. The T/R switch of claim 1 wherein transistors of the switch are fabricated with a minimum allowable channel length to minimize Ron.

8. The T/R switch of claim 1 further comprising biasing circuitry to bias the source/drain of all transistors to 0 V to minimize Ron.

9. The T/R switch of claim 1 wherein the first and second transmission lines are fabricated with a signal line formed in a top CMOS metal layer and with a ground layer formed in a lowest CMOS metal layer (M1).

10. A method of transmit/receive switching, the method comprising:
 using a single pole double throw switch (SPDT) module to selectively connect an antenna port to either a transmit port or to a receive port;
 impedance matching a transmitter to the transmit port by connecting a first transmission line between the transmitter and the transmit port;
 selectively grounding a transmitter end of the first transmission line, to isolate the transmitter during receive periods;
 impedance matching a receiver to the receive port by connecting a second transmission line between the receiver and the receive port; and
 selectively grounding a receiver end of the second transmission line, to isolate the receiver during transmit periods.

11. A fully integrated CMOS millimeter wave transceiver comprising a transmit/receive switch in accordance with claim 1.

* * * * *